No. 789,202. PATENTED MAY 9, 1905.
T. R. BROWN.
MULTIPLEX GAGE.
APPLICATION FILED MAY 6, 1904.

3 SHEETS—SHEET 1.

Witnesses:
F. E. Arthur,
B. E. Robinson.

Inventor:
Thomas R. Brown
By Howard P. Denison
Attorney.

No. 789,202. PATENTED MAY 9, 1905.
T. R. BROWN.
MULTIPLEX GAGE.
APPLICATION FILED MAY 6, 1904.

3 SHEETS—SHEET 2.

Witnesses:
F. E. Arthur
B. E. Robinson

Inventor:
Thomas R. Brown
By
Howard P. Denison
Attorney.

No. 789,202. PATENTED MAY 9, 1905.
T. R. BROWN.
MULTIPLEX GAGE.
APPLICATION FILED MAY 6, 1904.

3 SHEETS—SHEET 3.

WITNESSES,
B. E. Robinson.
F. E. Arthur.

INVENTOR,
Thomas R. Brown
BY,
Howard P. Denison
ATTORNEY.

No. 789,202.

Patented May 9, 1905.

UNITED STATES PATENT OFFICE.

THOMAS R. BROWN, OF WEMPLE, NEW YORK.

MULTIPLEX GAGE.

SPECIFICATION forming part of Letters Patent No. 789,202, dated May 9, 1905.

Application filed May 6, 1904. Serial No. 206,658.

*To all whom it may concern:*

Be it known that I, THOMAS R. BROWN, of Wemple, in the county of Albany, in the State of New York, have invented new and useful Improvements in Multiplex Gages, of which the following, taken in connection with the accompanying drawings, is a full, clear, and exact description.

This invention relates to a multiple-pressure gage which is particularly useful in indicating on a single dial the air-pressures of different parts of an air-brake system—as, for instance, the train-pipe, reservoir, and brake-cylinder—with which each car of the train is equipped. It is evident, however, that this gage is also applicable for use in other connections where it is desirable to indicate upon a single dial different pressures. For instance, it might be used to indicate the steam-pressure in a distributing system where it is desired to ascertain the comparative pressures at various points in the system.

My object, therefore, is to combine in a single instrument a series of pressure-indicating devices receiving the pressure fluid from the same or different sources, but distributed at the distributing device, so that the different pressures are indicated by separate readings or index-fingers.

Other objects and uses will appear in the following description.

Figure 1:
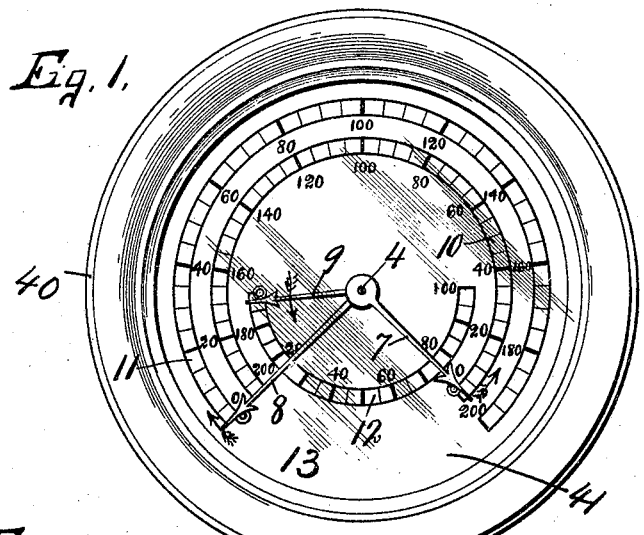
Figure 2:
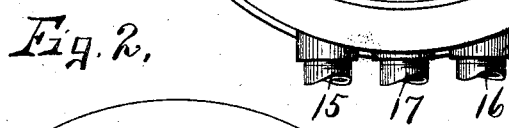
Figure 6:
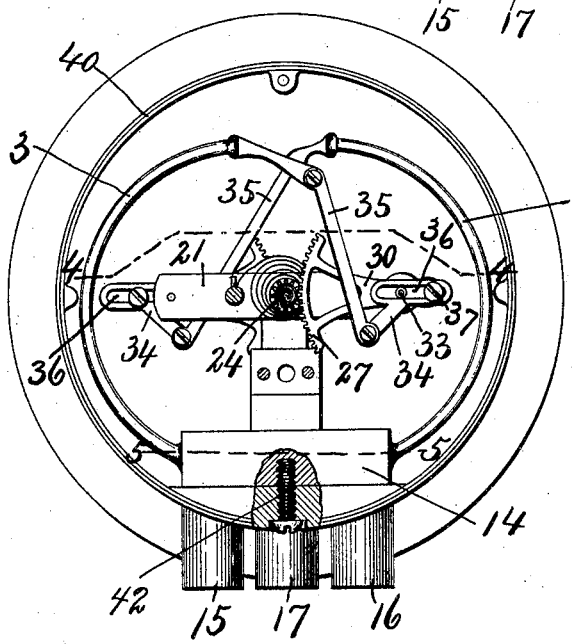
Figure 6:
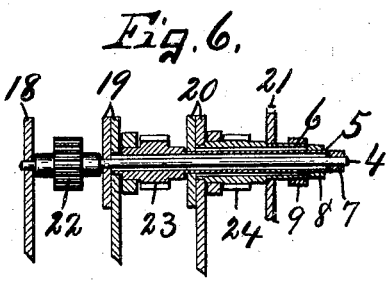
Figure 3:
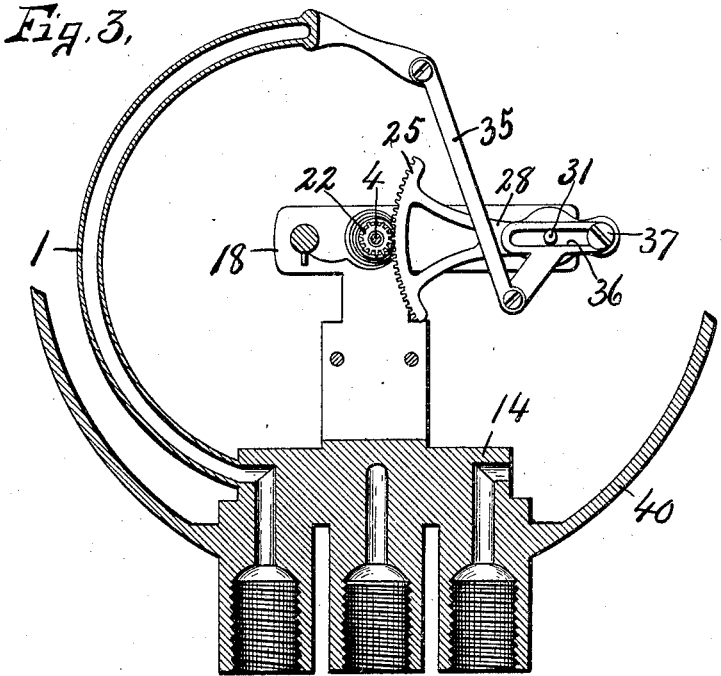
Figure 4:
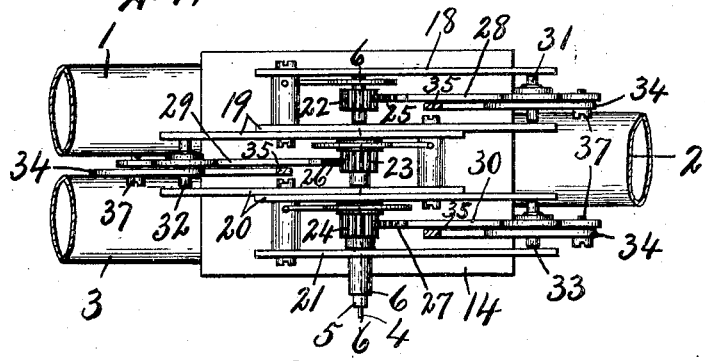
Figure 5:
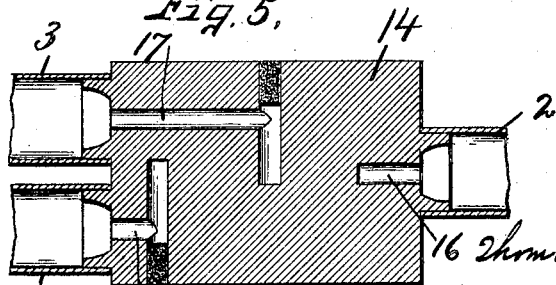
Figure 7:
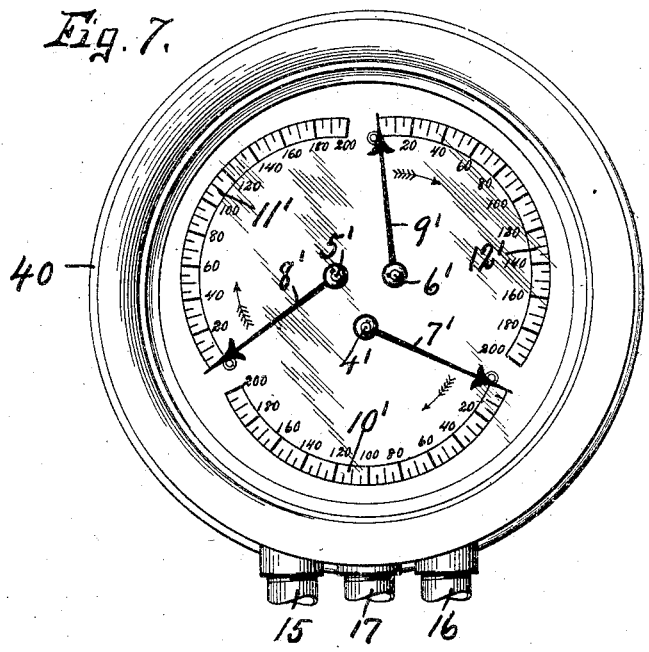
Figure 8:
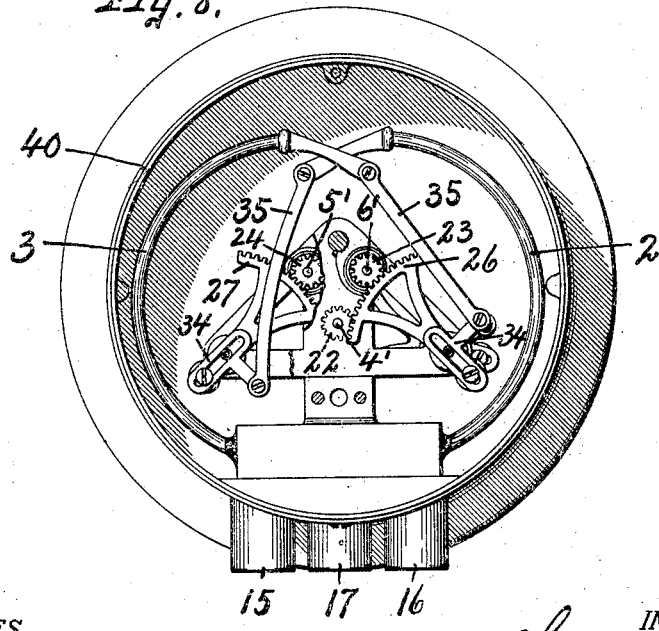

In the drawings, Figure 1 is a front face view of a multiple-pressure gage embodying the features of my invention, showing particularly the dial with a series of concentric scales and the index-fingers which are movable around their respective scales. Fig. 2 is a view similar to Fig. 1, except that the dial-plate and index-fingers are removed to disclose the underlying flexible tubes and mechanisms actuated thereby. Fig. 3 is an enlarged sectional view of one of the detached flexing-tubes, showing its connection with the distributing-head and also with a spindle to which its index-finger is secured. Figs. 4, 5, and 6 are sectional views taken, respectively, on lines 4 4, 5 5, Fig. 2, and 6 6, Fig. 4, Fig. 4 showing particularly the arrangement of the index-finger-operating spindles and their actuating mechanisms, while Fig. 5 shows the outlets in the distributing-head and the adjacent ends of the flexing-tubes which communicate with the outlets. Fig. 6 shows particularly the concentric spindles to which the index-fingers are secured. Figs. 7 and 8 are views similar to Figs. 1 and 2, showing a modified arrangement of the dials and index-fingers.

The invention consists, essentially, of a series of (in this instance three) separate curved spring-tubes 1, 2, and 3 and a corresponding number of separate spindles 4, 5, and 6, each of which is connected to and rotated by the flexing of one of the tubes, and are provided, respectively, with separate index-fingers 7, 8, and 9, which in turn are movable around suitable concentric scales 10, 11, and 12, to indicate the degree of pressure of the fluid in the train-pipe, reservoir, and brake-cylinder of an air-brake system. It is evident, however, that this multiple-pressure device is equally useful in other connections where it is desired to indicate different fluid-pressures on the same dial, as 13. These flexing-tubes 1, 2, and 3 are made of spring metal in substantially semicircular form and are arranged nearly concentric around the axis of their respective spindles, with one end fixed and open to receive the fluid under pressure and their outer ends free and closed to resist the fluid-pressure. This pressure at the closed free ends of the tubes causes them to extend more or less toward a straight line against their inherent spring action, and the degree of extension is proportionate to the degree of pressure in the tubes, or rather against their closed ends, and therefore by connecting these free ends of the tubes to their respective spindles the degree of pressure in pounds per square inch may be accurately indicated by the movement of the index-fingers along their respective scales on the dial 13.

The open ends of the tubes 1 and 3 are fixed to and spring from one side of a suitable distributing-head 14 and communicate, respectively, with separate inlet-conduits 15 and 17, while the open end of the tube 2 is fixed to and springs from the opposite side of said head and communicates with a separate inlet-conduit 16, so that the tubes 1 and 3 are located at one side of the spindles 7, 8, and 9 and the tube 2 is located at the opposite side, and therefore moves in a direction opposite to the other tubes when under fluid-pressure. The head 14 is provided with a series of upwardly-projecting fixed arms or plates 18, 19, 20, and 21, which are spaced apart for receiving and supporting the spindles 4, 5, and 6 and parts of their actuating mechanisms presently described.

The spindles 5 and 6 are hollow, and the spindle 4 extends centrally through and beyond the ends of the spindle 5 and is provided with a pinion 22 between the plates 18 and 19, in which the spindle 4 is journaled, while the outer end of said spindle 4 extends beyond the front end of the spindle 5 and receives the index-finger 7. The spindle 5 is journaled in the plates 19 and 20 in front of the pinion 22 and is provided with a pinion 23, which is located between the plates 19 and 20, while the front end of said spindle 5 extends beyond the adjacent end of the spindle 6 and receives the index-finger 8. The spindle 6 is journaled in the plates 20 and 21 in front of the pinion 22 and has a pinion 24 interposed between said plates, while its outer front end receives the index-finger 9.

Meshing with the pinions 22, 23, and 24 are separate toothed segments 25, 26, and 27, which are formed upon the inner ends of suitable levers 28, 29, and 30, the lever 28 being located between and fulcrumed at 31 upon the plates 18 and 19 at one side of the axis of the spindle and the lever 29 is located between and is fulcrumed at 32 upon the plates 19 and 20 at the opposite side of said axis, while the lever 30 is fulcrumed at 33 between and upon the plates 20 and 21 at the same side of the spindle-axis as the lever 28. In each instance the toothed segment and its operating-tube are located at opposite sides of the axis of the pinion and spindle which they actuate, so as to afford a maximum range of action for the free end of the tube.

The free ends of the tubes 1, 2, and 3 are each flexibly and adjustably connected to the outer ends of their respective levers 28, 29, and 30 by a pair of links 34 and 35. The links 34 are each formed with a lengthwise slot 36, which receives the fulcrum of its lever and also receives a clamping-screw 37, while the links 35 connect the links 34 to their respective tubes 1, 2, and 3. The object of this adjustment is to permit the racks and pinions to be properly adjusted to bring their index-fingers to the zero-points on the dial when the tubes are normal or free from influence by the fluid-pressure.

The parts thus far described, with the exception of the dial-plate, are all carried by the head 14 and are inclosed within a suitable cylindrical case 40, having a removable transparent front 41, covering the dial-plate and index-fingers. These plates are held in the case by securing the head to the bottom of the case by suitable fastening means, as screws 42.

In the operation of my multiple-pressure gage the conduits 15, 16, and 17, which project through the bottom of the case, are connected to receive the fluid the pressure of which is to be determined, and this fluid enters the tubes 1, 2, and 3 and causes their free ends to move toward a straight line a distance proportionate to the degree of pressure therein. This movement is transmitted to the index-fingers by the mechanisms previously described, whereby the degree of pressure is indicated upon the scales for each index-finger.

In Figs. 7 and 8 I have shown three spindles 4', 5', and 6', located some distance apart from each other, and therefore each has a separate axis parallel to the axes of the other spindle, which are provided with index-fingers 7', 8', and 9', movable around suitable dials 10', 11', and 12'. Otherwise the mechanism and operation is substantially the same as that previously described.

Having thus described my invention, what I claim, and desire to secure by Letters Patent, is—

In a pressure-gage, the combination of a spindle, a hollow spindle surrounding said first-named spindle and mounted in independent bearings so as to rotate out of contact with said first-named spindle, a second hollow spindle mounted in independent bearings so as to rotate out of contact with said first-named hollow spindle, and pinions and index-fingers carried by said first-named spindle and by both said hollow spindles, and means for independently rotating the three spindles, substantially as described.

In witness whereof I have hereunto set my hand this 23d day of April, 1904.

THOMAS R. BROWN.

Witnesses:
W. A. SNYDER,
G. P. TIFFANY.